United States Patent [19]

Nakayama

[11] Patent Number: 4,601,603
[45] Date of Patent: Jul. 22, 1986

[54] BALL JOINT

[75] Inventor: Hiromichi Nakayama, Nagoya, Japan

[73] Assignee: Nifco Inc., Yokohama, Japan

[21] Appl. No.: 762,179

[22] Filed: Aug. 5, 1985

[30] Foreign Application Priority Data

Aug. 13, 1984 [JP] Japan ............................ 59-122878[U]

[51] Int. Cl.⁴ .............................................. F16C 11/06
[52] U.S. Cl. .................................... 403/143; 403/122;
403/321; 403/326
[58] Field of Search ............... 403/143, 122, 326, 321,
403/322, 316, 135, 136, 327

[56] References Cited

U.S. PATENT DOCUMENTS

| 3,428,348 | 2/1969 | Pelton | 403/321 X |
| 4,410,295 | 10/1983 | Ersoy et al. | 403/135 X |
| 4,435,101 | 3/1984 | Sugiyama et al. | 403/122 |
| 4,482,266 | 11/1984 | Kaneko | 403/135 |

FOREIGN PATENT DOCUMENTS 59-17017  1/1984  Japan .

Primary Examiner—Cornelius J. Husar
Assistant Examiner—Todd G. Williams
Attorney, Agent, or Firm—Trexler, Bushnell & Wolters, Ltd.

[57] ABSTRACT

A ball joint in which the ball of a ball stud is accommodated in an accommodating section of a socket. The accommodating section has an annular seat on which a stopper is provided and a cap to be fitted in the accommodating section has another stopper. The two stoppers are received in a gap in an elastic ring-like member mounted in the annular seat such that a turning of the cap will increase the width of the gap to increase the diameter of the elastic ring-like member. In this state, the ball of the ball stud can be accommodated in the accommodating section of the socket.

3 Claims, 9 Drawing Figures

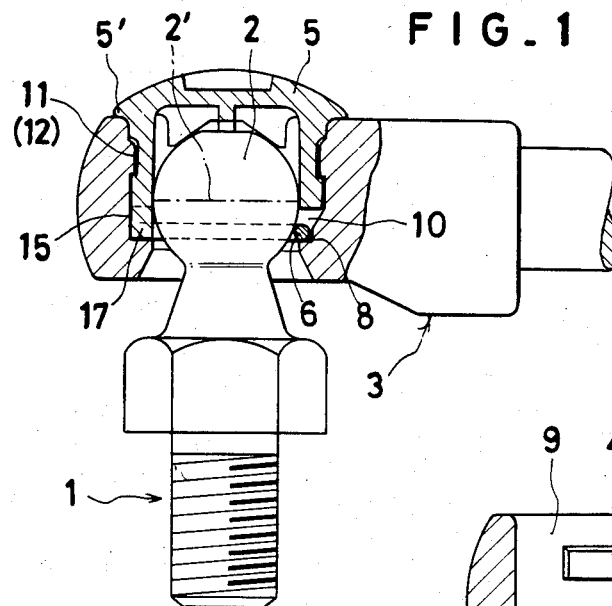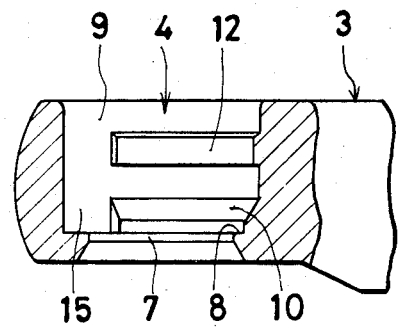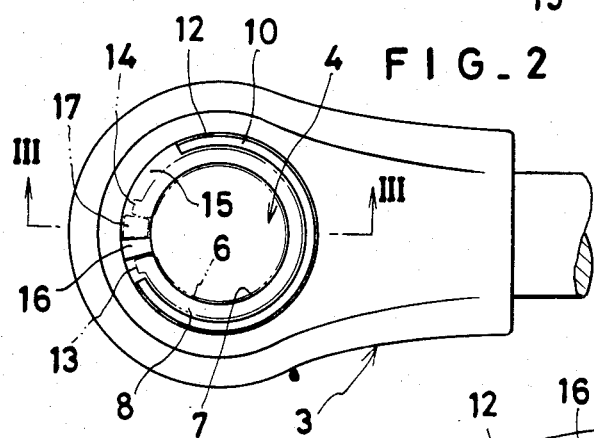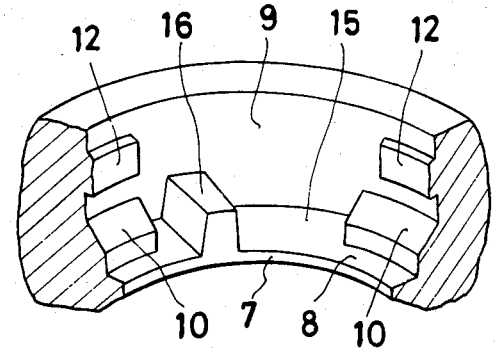

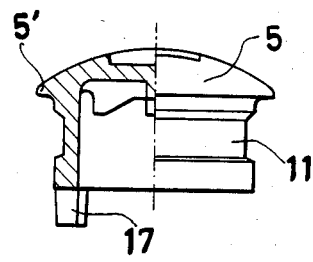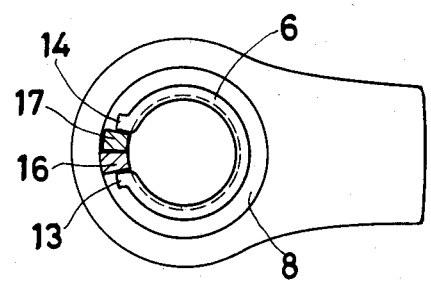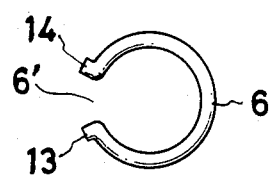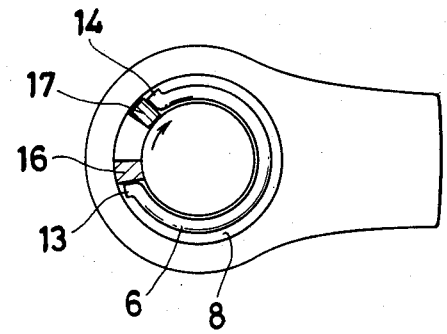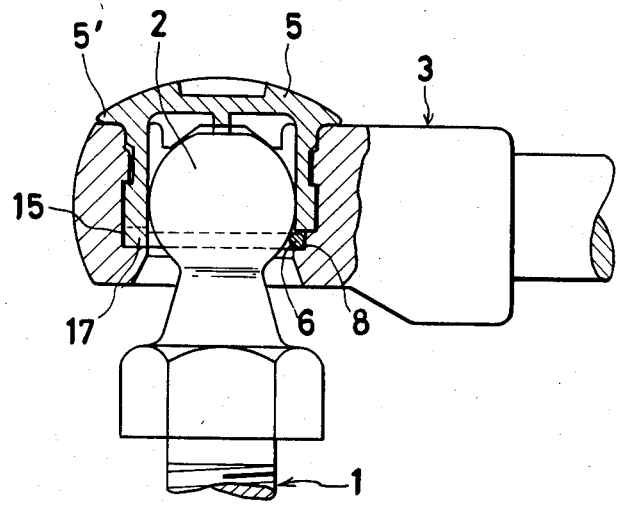

BALL JOINT

BACKGROUND OF THE INVENTION

This invention relates to a ball joint which is used for such purposes as rotatably securing a piston end and a cylinder end of a piston-cylinder type air spring for coupling a vehicle body and a hatch door of a hatch-back type vehicle to the vehicle body and the door.

In order to permit smooth opening and closing of a hatch door of a hatch-back type vehicle and also permit the door to be suitably held open, an air spring or like coupler is provided between the vehicle body and the hatch door. The air spring consists of a cylinder and an extensible piston rod accommodated therein. This air spring adopts a ball joint structure for the portions where it is coupled to the vehicle body and the door.

Such a ball joint is disclosed in Japanese Patent Application Disclosure SHO No. 59(1984)-17017. The disclosed ball joint comprises a socket and a ball stud having a ball accommodated in a accommodating section formed in the socket as a vertical passage. In the accommodating section is also accommodated an elastic ring-like member which has an inner diameter smaller than the diameter of the equator of the ball and is cut away in a portion of the circumference thereof to form a gap therein. Further, a cap is screwed in the accommodating section from above to cover substantially the upper half of the ball. In this state, the portion of the ball below the equator is held by the elastic ring-like member.

In the above structure, as the cap is screwed down, its lower end downwardly urges the elastic ring-like member to prevent spreading thereof. Therefore, when disassembling the socket and ball stud, it is necessary to loosen the cap by turning it several rotations so that the lower end of the cap is separated from the elastic ring-like member, which thus can be spread. The fastening of the cap by downwardly screwing it and also its loosening by unscrewing it are rather cumbersome and time-consuming.

SUMMARY OF THE INVENTION

An object of the invention is to provide a ball joint wherein a cap for holding the ball of a ball stud in an accommodating section of a socket can be readily fitted and the ball stud and socket can be readily assembled together and disassembled from each other.

To attain the above object of the invention, there is provided a ball joint which comprises a ball stud having a ball at one end, a socket with an accommodating section for accommodating the ball of the ball stud, an elastic ring-like member mounted on a seat of the accommodating section, the elastic ring-like member having an inner diameter smaller than the diameter of the ball and being cut away to provide a gap therein, and a cap fitted in the accommodating section to cover substantially the upper half of the ball, the portion of the ball below the equator being held by the elastic ring-like member, the cap being rotatable in the state fitted in the accommodating section and the seat of the accommodating section and the lower end of the cap being provided with respective stoppers cooperatively invading the gap of the elastic ring-like member.

Since the cap is not screwed but is snap fitted in the accommodating section and is rotatable in the fitted state while the seat of the accommodating section and the lower end of the cap are provided with the respective stoppers cooperatingly invading the gap of the elastic ring-like member, by turning the cap in the direction of increasing the gap of the elastic ring-like member one end thereof engages the stopper on the seat to restrict the rotation of the elastic ring-like member while the stopper on the cap side engages the other end of the elastic ring-like member to increase the gap against the elasticity of the elastic ring-like member. The inner diameter of the elastic ring-like member thus can be made greater than the diameter of the ball of the ball stud, so that the ball can be readily taken out from the accommodating section of the socket.

The above and other objects and features of the invention will become more apparent from the description of the preferred embodiments when the same is read with reference to the accompanying drawings.

BRIEF DESCRIPTION OF THE DRAWINGS

FIG. 1 is a sectional view showing a first embodiment of the ball joint according to the invention;

FIG. 2 is a plan view showing a socket;

FIG. 3 is a sectional view taken along line III—III in FIG. 2;

FIG. 4 is a fragmentary enlarged perspective view of an accomodating section of the socket;

FIG. 5 is a side view, partly in section, showing a cap;

FIG. 6 is a plan view showing an elastic ring-like member;

FIGS. 7 and 8 are views for explaining the operation of the first embodiment; and FIG. 9 is a sectional view showing another embodiment of the invention.

DESCRIPTION OF THE PREFERRED EMBODIMENTS

Referring to FIGS. 1 to 8, reference numeral 1 designates a metal ball stud, 2 a ball disposed integrally at one end of the ball stud 1 and provided with the equator 2' of the ball 2, 3 a socket, 4 an accommodating section for accommodating the ball 2 formed as a vertical passage through its one end, 5 a cap, and 6 an elastic metal ring-like member which is not a full ring but has opposite ends defining a gap 6' therebetween. The socket and cap are plastic moldings.

The accommodating section 4 has a lower end opening 7, the diameter of which is slightly greater than the diameter of the equator 2' of the ball. It has a stepped annular seat 8 of a diameter matched to the outer diameter of the elastic ring-like member 6. The inner diameter of the elastic ring 6 is slightly smaller than the diameter of the equator 2' of the ball 2.

The upper portion of the accommodating section 4 is a cylindrical region 9, the diameter of which is greater than the inner diameter of the seat 8. A tapered surface 10 extends from the lower end of the cylindrical region 9 downwardly toward the top surface of the annular seat 8.

The cap 5 is adapted to snugly fit in the cylindrical region 9. Either the outer periphery of the cap 5 or the inner periphery of the cylindrical surface 9 is provided with an annular groove 11, while the other is provided with an annular projection 12 adapted to be snap fitted in the annular groove 11. When the cap 5 is forced into the cylindrical region 9 from above until a flange 5' projecting from the edge of the top of the cap 5 engages the top of the accommodating section 4, the annular groove 11 and annular projection 12 are snap engaged, and the cap is rotatably received in the accommodating section 4. In this state, the lower end of the cap 5 substantially reaches the lower end of the cylindrical region 9, and the upper half of the ball 2 is received in a downwardly open inner space of the cap.

At this time, the gap 6' is defined between the opposite ends of the elastic ring-like member 6. In this embodiment, the opposite ends of the elastic loop-like member are bent radially outwardly to form short pawls 13 and 14. The accommodating section 4 has an arcuate notch 15 which is formed in the tapered surface 10. A stopper 16 is provided so as to define a gap corresponding to the thickness of the elastic ring-like member 6 with respect to one end of the arcuate notch 15. The stopper 16 also defines with the other end of the arcuate notch 15 a gap sufficient to increase the inner diameter of the elastic ring-like member to greater than the equator 2' of the ball. The cap 5 has a stopper 17 downwardly projecting from the lower end into the arcuate notch 15. The gap 6' between the opposite ends of the elastic ring-like member 6 is slightly greater than the sum of the thicknesses of the stoppers 16 and 17.

In assembly, the elastic ring-like member is set on the annular seat 8 by fitting the elastic ring-like member into the accommodating section 4 and locating the pawl 13 in the space between one end of the arcuate notch 15 and the stopper 16. Then the cap is pushed into the accommodating section from above such that the stopper 17 of the cap is guided along the stopper 16. Thus, the stoppers 16 and 17 are located in the gap 6' in the elastic ring-like member.

Then, the ball 2 of the ball stud 1 is thrust into the accommodating section from below. The ball 2 enters the accommodating section through the lower end opening 7 and raises the tapered surface 10 while bearing the elastic ring-like member provided in the annular seat 8. The elastic ring-like member riding on the ball is raised up to the maximum diameter upper end of the tapered surface, and then, it comes into contact with the lower end of the cap. When the ball stud is further raised, the ball penetrates the elastic ring-like member from below. As a result, the pawl 14 of the elastic ring-like member 14 is moved in the arcuate notch 13 away from the stopper 17 of the cap, whereby the inner diameter of the elastic ring-like member is increased to permit the passage of the equator 2' of the ball through the ring-like member. When the elastic ring-like member has cleared the equator of the ball, it resumes its initial state by its elasticity. At this time, it falls along the tapered surface to be seated on the annular seat 8 so that it supports the portion of the ball below the equator. The assembly is completed in this manner.

In this state, the outer periphery of the elastic ring-like member is surrounded by the inner periphery of the annular seat. Thus, even by pulling the elastic ring-like member very strongly, the elastic ring-like member cannot be spread, and hence the ball stud will not be detached from the socket.

To separate the ball stud and socket in this assembled state, the cap is turned such that the stopper 17 of the cap pushes the pawl 14 of the elastic ring-like member toward the other end of the arcuate notch (FIGS. 7 and 8). Since the other pawl 13 is in engagement with the stopper 16 and is restricted against rotation, the elastic ring-like member thus increases its diameter so that its inner diameter becomes greater than the diameter of the equator of the ball. The ball stud thus can be disassembled by pulling it downwards, whereby the equator of the ball clears the inner diameter of the spread elastic ring-like member.

By releasing the force tending to turn the cap, the cap is turned in the opposite direction by the restoring force of the elastic ring-like member to the initial state. Thus, the ball stud and socket can be assembled together again in the manner as described above. The ball stud and socket can be assembled together by turning the cap in the same manner as when removing the ball stud so that the elastic ring-like member is spread by the stopper 17 of the cap to a state with the inner diameter made greater than the diameter of the equator of the ball, then inserting the ball into the accommodating section from below, and releasing the force used to turn the cap.

FIG. 9 shows a different embodiment, in which the ball stud and socket are assembled together in the above way. In this instance, the tapered surface 10 is not provided in the accommodating section, i.e., annular seat 8 is provided right under the cylindrical region 9. In the embodiment of FIGS. 1 to 8, after having been raised up to the upper end of the tapered surface, the elastic ring-like member has to be spread and has to fall on the annular seat after being cleared by the equator of the ball. In this case, therefore, the ball will rattle slightly in the vertical direction in the accommodating section. In the embodiment of FIG. 9, such rattling can be eliminated.

In either case, the top of the cap 5 is formed with a groove into which the end of a tool such as a screwdriver, may be inserted for tuning the cap.

As has been described in the foregoing, according to the invention the ball stud and socket can be disassembled from each other by slightly turning the cap so as to increase the inner diameter of the elastic ring-like member to be slightly greater than the equator of the ball.

What is claimed is:

1. A ball joint comprising a ball stud having a ball at one end; a socket with an accommodating section for accommodating said ball and formed as a vertical passage through its one end, a lower end opening of said accommodating section being slightly greater than the diameter of said ball, said accommodating section having a cylindrical region found above said lower end opening and terminating at an annular seat provided on a portion thereof with a stopper; an elastic ring-like member mounted on said annular seat of said socket, said ring-like member being cut away to form a gap therein; and a cap rotatably fitted in said accommodating section of said socket from above and having a flange surrounding said accommodating section and a stopper cooperating with said stopper formed on said annular seat of said socket; said cap being fitted in said accommodating section of said socket so that said stopper on said annular seat of said socket and said stopper of said cap are located in said gap of said elastic ring-like member, whereby the diameter of said elastic ring-like member can be varied by turning said cap.

2. The ball joint according to claim 1, wherein said accommodating section has a tapered surface formed above said annular seat of said socket.

3. The ball joint according to claim 1, wherein said cylindrical region of said accommodating section is provided with an annular groove, and the outer periphery of said cap is formed with an annular projection to be snap fitted in said annular groove.

* * * * *